(12) United States Patent
Lawless

(10) Patent No.: US 9,503,871 B2
(45) Date of Patent: Nov. 22, 2016

(54) SYSTEMS AND METHODS FOR PROVIDING NOTIFICATIONS IN A COMMUNICATIONS SYSTEM

(71) Applicant: MASTERCARD INTERNATIONAL INCORPORATED, Purchase, NY (US)

(72) Inventor: Paul Lawless, Dublin (IE)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 41 days.

(21) Appl. No.: 14/542,204

(22) Filed: Nov. 14, 2014

(65) Prior Publication Data

US 2015/0141063 A1 May 21, 2015

(30) Foreign Application Priority Data

Nov. 18, 2013 (GB) .................................... 1320348.4

(51) Int. Cl.
*H04W 4/00* (2009.01)
*H04W 4/18* (2009.01)
(Continued)

(52) U.S. Cl.
CPC .................. *H04W 4/18* (2013.01); *H04L 1/08* (2013.01); *H04W 4/12* (2013.01)

(58) Field of Classification Search
CPC .......... H04Q 7/20; H04W 8/04; H04W 8/22; H04W 8/245; H04W 84/16; H04W 92/02; H04W 48/18; H04W 76/022; H04W 80/04; H04W 36/14; H04W 36/24; H04W 4/18; H04W 4/12; H04L 29/06027; H04L 65/4084; H04L 65/1043; H04L 65/4076; H04L 12/28; H04L 1/08; H04N 21/41407; H04N 21/6131; H04N 21/64315; H04N 21/643; H04M 3/42246

USPC ........... 455/466, 56.5, 445, 552.1; 709/227; 370/389, 328, 352
See application file for complete search history.

(56) References Cited

U.S. PATENT DOCUMENTS

| 7,215,946 B1 | 5/2007 | Cardina et al. |
| 2002/0090975 A1* | 7/2002 | Laiho .................... H04W 68/12 455/552.1 |

(Continued)

FOREIGN PATENT DOCUMENTS

| GB | 2494154 A | 3/2013 |
| WO | WO02/078311 | 10/2002 |
| WO | WO2008/104047 | 9/2008 |

*Primary Examiner* — Mahendra Patel
(74) *Attorney, Agent, or Firm* — Harness, Dickey & Pierce, P.L.C.

(57) ABSTRACT

The present disclosure relates to systems and methods for providing notifications in a communication system. In connection therewith, a first communication is transmitted, by a processor, in accordance with a first communication scheme that defines a first communication service by which the first communication is to be transmitted and a first user device to which the first communication is to be transmitted. The processor estimates whether the first communication was received by the first user device. Responsive to estimating that the first communication was not received by the first user device, the processor operates to determine a further communication scheme, different to the first communication scheme, that defines a further communication service by which a further communication is to be transmitted and a further user device to which the further communication is to be transmitted, and operates to transmit the further communication in accordance with the further communication scheme.

21 Claims, 4 Drawing Sheets

(51) Int. Cl.
*H04L 1/08* (2006.01)
*H04W 4/12* (2009.01)

(56) References Cited

U.S. PATENT DOCUMENTS

| | | | |
|---|---|---|---|
| 2004/0158611 A1 | 8/2004 | Daniell et al. | |
| 2006/0007877 A1* | 1/2006 | Vaittinen | H04W 76/064 370/328 |
| 2006/0092925 A1* | 5/2006 | Svensson | H04W 8/06 370/352 |
| 2006/0121916 A1* | 6/2006 | Aborn | H04M 3/42246 455/456.5 |
| 2006/0178146 A1* | 8/2006 | Lee | H04W 8/04 455/435.1 |
| 2006/0286984 A1* | 12/2006 | Bonner | H04W 36/14 455/445 |
| 2007/0022200 A1* | 1/2007 | Benkert | H04L 29/06027 709/227 |
| 2007/0281704 A1* | 12/2007 | Lin | H04W 68/12 455/445 |
| 2008/0205386 A1* | 8/2008 | Purnadi | H04W 48/18 370/389 |
| 2010/0124905 A1 | 5/2010 | Pratt et al. | |
| 2011/0185237 A1 | 7/2011 | Mahdi et al. | |
| 2015/0208286 A1* | 7/2015 | Ozturk | H04W 36/0022 370/331 |

* cited by examiner

SYSTEMS AND METHODS FOR PROVIDING NOTIFICATIONS IN A COMMUNICATIONS SYSTEM

CROSS-REFERENCE TO RELATED APPLICATION

This application claims the benefit of and priority to Great Britain Application No. 1320348.4 filed Nov. 18, 2013. The entire disclosure of the above application is incorporated herein by reference.

FIELD

The present disclosure relates to the provision of notifications in a communication system. More particularly, the disclosure relates to methods and systems of providing multiple forms of notifications in a communication system.

BACKGROUND

This section provides background information related to the present disclosure which is not necessarily prior art.

Notification systems provide a means of delivering communications or information to one or more recipients. Notification systems are regularly used to send a communication such as an email or SMS to one or more recipients to indicate that an event has occurred. For example, recipients interested in a particular discussion on a website may register to receive a notification any time new comments are added to the discussion. In a further example, notifications may be used to alert recipients to emergency situations.

However, there are many situations in which it would be desirable to provide an improved notification system that is adaptable to changes in an operational environment.

SUMMARY

This section provides a general summary of the disclosure, and is not a comprehensive disclosure of its full scope or all of its features.

In accordance with a first aspect of the present disclosure, there is provided a method of transmitting a communication to a user, the method comprising operating a processor to: (a) transmit a first communication in accordance with a first communication scheme, the first communication scheme defining a first communication service by which the first communication is to be transmitted and a first user device to which the first communication is to be transmitted; (b) estimate whether the first communication was received by the first user device and responsive to estimating that the first communication was not received by the first user device, operating a processor to: (c) determine a further communication scheme different to the first communication scheme, the further communication scheme defining a further communication service by which a further communication is to be transmitted and a further user device to which the further communication is to be transmitted; and (d) transmit the further communication in accordance with the further communication scheme. In this manner, a more reliable method of communicating with a user is provided.

Operating a processor to determine a further communication scheme different to the first communication scheme may comprise operating the processor to determine a further communication scheme defining at least one of: (i) a further communication service different to the first communication service; and (ii) a further user device different to the first user device.

In an embodiment, operating a processor to estimate whether the first communication is received by the first user device comprises operating the processor to: determine whether an acknowledgment response has been received from the first user device within a predefined period from transmission of the first communication.

The method may further comprise operating a processor to: determine whether the further communication is received by the further user device, and responsive to determining that the further communication was not received by the further user device, operating the processor to: repeat steps (c) and (d).

The processor may be operated to repeat steps (c) and (d) which comprises operating the processor to repeat steps (c) and (d) until the processor determines that one or more of the following conditions has been met: no further communication scheme is determined at step (c); a predefined period of time has expired since transmission of the first communication; and steps (c) and (d) have been performed a predefined number of times. In this manner, the processor may continue to transmit the notification using different communication schemes and/or to different devices associated with the user until a communication is successfully received at a device associated with the user.

Prior to performing steps (a) to (d), the method may comprise operating a processor to: receive a list of preferred communication schemes from a device associated with the user; store the received list of communication schemes in association with an identifier of the user; and determine a potential set of communication schemes based, at least in part, on the received list of preferred communication schemes; wherein at step (c) the further communication scheme is determined from the potential set of communication schemes.

Transmitting the first communication in accordance with the first communication scheme may comprise: determining the first communication scheme from the potential set of communication schemes.

The received list of preferred communication schemes may have an associated list order and wherein the further communication scheme is determined in accordance with the list order.

The communication may be associated with an application being executed on at least one of the first user device and the further user device.

The potential set of communication schemes may be further based on one or more of: a location of at least one device associated with the user; and the application being executed on the at least one device associated with the user.

The communication may comprise information received from a remote server associated with the application being executed on the at least one user device.

The set of potential communication schemes may comprise two or more communication schemes each of which defines a respective communication service from the group of: transmission of data using Short Message Service (SMS); initiation of an audio transmission via a Public Switched Telephone Network (PSTN) and/or a Private Branch Exchange (PBX) to the user device; transmission of data using SMTP or TCP/IP protocol; transmission of an application notification; transmission of data using Bluetooth™.

According to a further aspect of the present disclosure, there is provided a notification engine for transmitting a communication to a user, the notification engine comprising a processor configured to: (a) transmit a first communication in accordance with a first communication scheme, the first communication scheme defining a first communication service by which the first communication is to be transmitted and a first user device to which the first communication is to be transmitted; (b) estimate whether the first communication was received by the first user device and responsive to estimating that the first communication was not received by the first user device, operate a processor to: (c) determine a further communication scheme different to the first communication scheme, the further communication scheme defining a further communication service by which a further communication is to be transmitted and a further user device to which the further communication is to be transmitted; and (d) transmit a further communication in accordance with the further communication scheme.

The processor of the notification engine may be configured to estimate whether the communication is received by the first user device by: determining whether an acknowledgment response has been received from the first user device within a predefined period from transmission of the first communication.

The processor of the notification engine may be further configured to: determine whether the further communication is received by the further user device, and responsive to determining that the further communication was not received by the further user device to: repeat steps (c) and (d).

The processor of the notification engine may be configured to repeat steps (c) and (d) until the processor determines that one or more of the following conditions has been met: no further communication scheme is determined at step (c); a predefined period of time has expired since transmission of the first communication; and steps (c) and (d) have been performed a predefined number of times.

Prior to performing steps (a) to (d), the processor of the notification engine may be configured to: receive a list of preferred communication schemes from a device associated with the user; store the received list of communication schemes in association with an identifier of the user; and determine a potential set of communication schemes based, at least in part, on the received list of preferred communication schemes; wherein at step (c) the further communication scheme is determined from the potential set of communication schemes.

The received list of preferred communication schemes may have an associated list order and wherein the processor is configured to determine the further communication scheme in accordance with the list order.

The communication may be associated with an application being executed on at least one of the first user device and the further user device.

The processor of the notification engine may be further configured to determine the potential set of communication schemes based on one or more of: a location of at least one device associated with the user; and the application being executed on the at least one device associated with the user.

The communication may comprise information received from a remote server associated with the application being executed on the user device.

The set of potential communication schemes may comprise two or more communication schemes each defining a respective communication service from the group of: transmission of data using Short Message Service (SMS); initiation of an audio transmission via a Public Switched Telephone Network (PSTN) and/or a Private Branch Exchange (PBX) to the user device; transmission of data using SMTP or TCP/IP protocol; transmission of an application notification; transmission of data using Bluetooth™.

According to a further aspect of the disclosure, there is provided a processor comprising electronic circuitry configured to: (a) transmit a first communication in accordance with a first communication scheme, the first communication scheme defining a first communication service by which the first communication is to be transmitted and a first user device to which the first communication is to be transmitted; (b) estimate whether the first communication was received by the first user device and responsive to estimating that the first communication was not received by the first user device, operate a processor to: (c) determine a further communication scheme different to the first communication scheme, the further communication scheme defining a further communication service by which a further communication is to be transmitted and a further user device to which the further communication is to be transmitted; and (d) transmit a further communication in accordance with the further communication scheme.

According to a further aspect of the disclosure, there is provided a non-transitory computer readable medium comprising instructions which, when executed, cause a processor to: (a) transmit a first communication in accordance with a first communication scheme, the first communication scheme defining a first communication service by which the first communication is to be transmitted and a first user device to which the first communication is to be transmitted; (b) estimate whether the first communication was received by the first user device and responsive to estimating that the first communication was not received by the first user device, operate a processor to: (c) determine a further communication scheme different to the first communication scheme, the further communication scheme defining a further communication service by which a further communication is to be transmitted and a further user device to which the further communication is to be transmitted; and (d) transmit a further communication in accordance with the further communication scheme.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure. Embodiments of the present disclosure will now be described, by way of example only, with reference to the accompanying drawings, in which.

Corresponding reference numerals indicate corresponding parts throughout the several views of the drawings.

DESCRIPTION

Specific embodiments of the present disclosure will be described below with reference to the Figures. The description and specific examples included herein are intended for purposes of illustration only and are not intended to limit the scope of the present disclosure.

Figure 1:
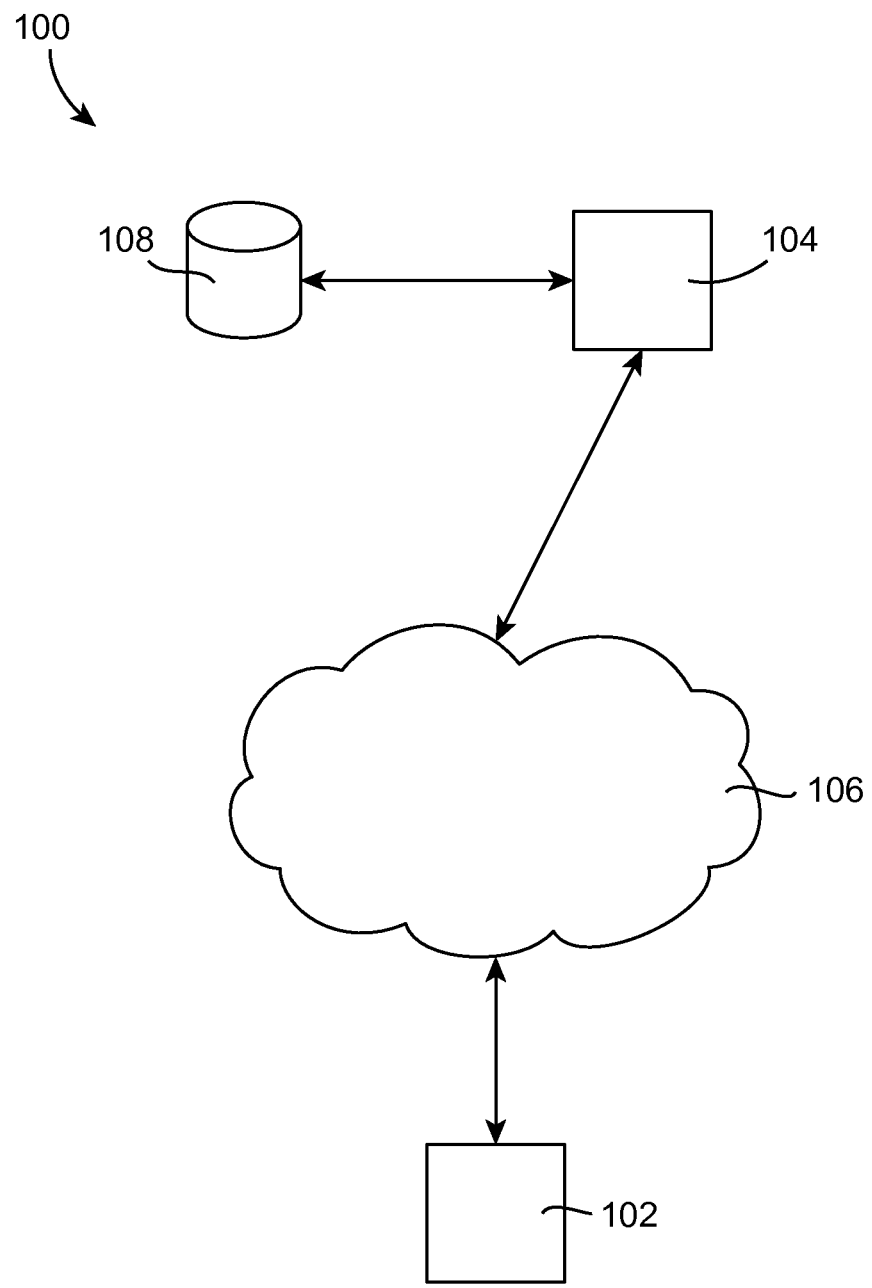
FIG. 1 is a diagram of a notification system in accordance with an embodiment of the disclosure.

Referring to the drawings and, in particular to FIG. 1, an exemplary notification system or scheme 100 is shown. The system 100 comprises at least one user device 102 capable of, or adapted to, receive communications from a notification engine 104.

The at least one user device 102 may comprise one or more devices of the same type. Alternatively, the at least one user device 102 may comprise a plurality of devices of different types. For example, the at least one user device 102 may comprise one or more of: a portable device such as a pager, a portable telephone, a watch, a portable computer, a tablet computer; a fixed device such as a desktop computer, a fixed-line (or landline) telephone; or any other suitable communication device.

The notification engine 104 may comprise, or be comprised within, any suitable device. For example, the notification engine 104 may comprise, or be comprised within, a remote server associated with one or more applications being executed by the user device 102. Additionally or alternatively, the notification engine 104 may be comprised within a base station. In what follows, the method steps are described as being performed by the notification engine 104. However, it will be appreciated that these steps may be performed by other elements of the system 100, or by one or more processors comprised within the notification engine 104 or other elements of the system 100.

The notification engine 104 may be configured to communicate with one or more databases 108, for example, via a wired or wireless connection. For example, the notification engine 104 may write data to the one or more databases 108. Additionally or alternatively, the notification engine 104 may retrieve data stored in or accessible to the database 108.

The user device 102 and the notification engine 104 may communicate using any suitable means. For example, the user device 102 and the notification engine 104 may communicate using one or more of Bluetooth™; Near-Field Communication (NFC); Infra-Red (IR) Communication; Magnetic Induction; or over a wired or wireless network 106.

In an exemplary embodiment, the network 106 may comprise any network across which communications can be transmitted and received. For example, the network 106 may comprise a wired or wireless network. The network 106 may, for example, comprise one or more of: the internet; a local area network; a radio network such as a mobile or cellular network; a mobile data network or any other suitable type of network. In one embodiment the user device 102 communicates over the internet with a notification engine 104 operating on 'a cloud'.

Figure 2:
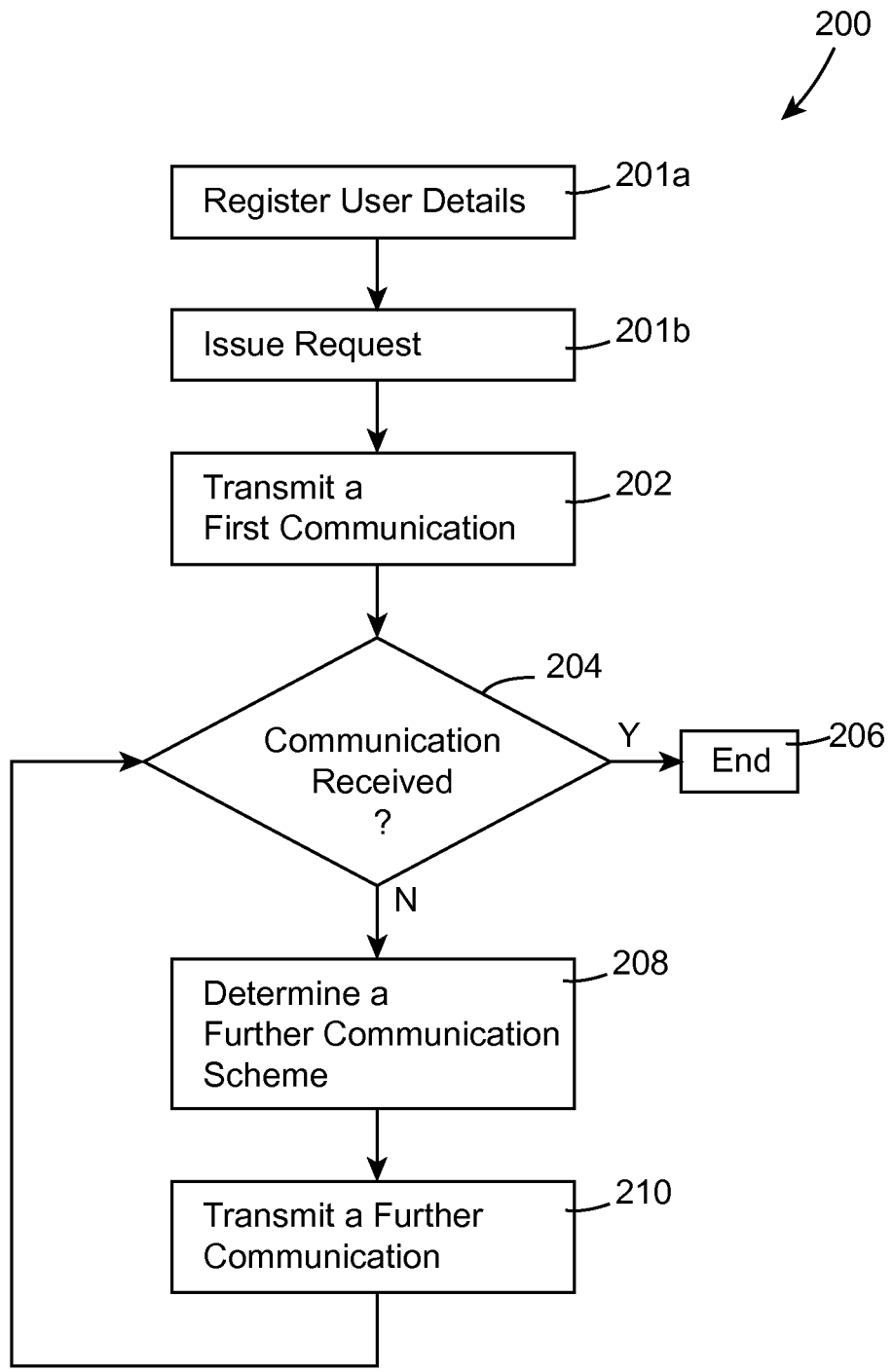
FIG. 2 is a flow diagram depicting a method of transmitting a notification to a user device in accordance with an embodiment of the disclosure.

FIG. 2 depicts a method 200 of operating the system 100 in accordance with an embodiment of the present disclosure. The system 100 may be operated by or in association with a provider of goods and/or services. For example, the system 100 may be operated in association with a food outlet, or a department store. Additionally or alternatively, the provider of the system 100 may also provide, or operate in association with a provider of, a software application or 'app' that can be executed on a computing device.

At step 201a, a user of one or more user devices 102 registers or enrolls to use the system 100. The registration may be performed by any suitable means. For example, the user may register to use the system 100 via a website, by telephone, by text message etc.

Registration information may, for example, comprise user details e.g. name, address, age etc. Additionally, or alternatively, registration information may comprise information indicative of one or more communication schemes via which the user would like to receive specified notifications, wherein a communication scheme defines a communication service by (or via) which a communication is to be transmitted and a user device 102 to which the communication is to be transmitted. Communication schemes will be discussed further in respect to FIGS. 2 and 3.

This information may, for example, indicate a relative order of preference for each of the indicated communication schemes.

In an embodiment in which the system 100 is provided by, or in association with, a software application ('app'), the registration step 201a may comprise a user installing the application on one or more user devices 102. Additionally or alternatively, the registration step 201a may comprise one or more of: the user authorizing the application to provide notifications to one or more user devices 102 associated with the user; one or more user devices 102 executing the application; and the user inputting or updating registration information via an interface of, or associated with, the application.

At step 201b a request or order is transmitted by, or in association with, a user device 102. The request may be transmitted to the notification engine 104 or to a server, or a base station, operating in association with the notification engine 104. The request may, for example, comprise an order for goods or services and/or a request for information. For example, in an embodiment in which the system 100 is provided by, or in association with a food outlet, the request may be a food order. Similarly, in an embodiment in which the system 100 is provided by, or in association with a news service, the request may comprise a request for one or more news stories.

It will be appreciated that one or both of steps 201a and 201b may be omitted. Similarly, steps 201a and 201b may be combined to form a single step, in which case the request transmitted at step 201b may additionally comprise any registration information.

At step 202, the notification engine 104 transmits a first communication to a user device 102 in accordance with a first communication scheme.

The notification engine 104 may transmit the first communication responsive to determining that a predefined event has occurred. For example, the notification engine 104 may transmit the first communication in response to the user providing registration details at step 201a and/or in response to the user device 102 transmitting a request at step 201b.

In an exemplary embodiment in which the system 100 is provided in association a food outlet, the notification engine 104 transmits the first communication responsive to receiving an indication that a food order placed by, or in association with, a user device 102 is ready for collection.

In an exemplary embodiment in which the system 100 is provided in association with a news service, the notification engine 104 transmits the first communication responsive to receiving an indication that a news story of interest to a user of a user device 102 is available.

The first communication may comprise any message and/or notification comprising data indicative of the occurrence of an event. For example, the first communication may comprise data indicative of one or more of the following: an emergency situation; publication of an article of interest; proximity of the first user device 102 to a predefined location or service; and the occurrence of any other predefined event. The notification engine 104 may generate some or all of the data included in the first communication. Additionally or alternatively, the notification engine 104 may include data received from another device in the first communication. For example, the notification engine 104 may retrieve data from the database 108 and include the retrieved data in the first communication.

The first communication scheme may define any suitable first user device 102 to which the first communication is to be transmitted. For example, in an embodiment in which the notification engine 104 transmits the first communication in response to a user device 102 transmitting a request at step 201b, the first user device 102 may be defined to be the same as the user device 102 that transmitted the request at step 201b. Alternatively, the user device 102 may be a device other than that which transmitted the request at 201b.

The first communication scheme used to transmit the first communication may define any suitable first communication service or means for transmitting information from the notification engine 104 to a user device 102. For example, the first communication service used by the notification engine 104 may comprise any one of: Short Message Service (SMS) (or 'text' message); voice communication; e-mail communication using, e.g., one or more of POP, IMAP, SMTP; a notification e.g. a toast, a passive pop-up or pop-up notification, a desktop notification, a notification bubble, a balloon notification, a desktop alert, a dialog, or a modal window; Instant Messaging (IM), e.g. IRC, ICQ, AIM, Yahoo! Messenger, MSN, XMPP, iMessage, Blackberry Messenger etc.; a pager service using, e.g. Simple Network Paging Protocol (SNPP); RSS feed; cell broadcast; and any other suitable protocol or service for transmitting a communication to a user device 102.

In an exemplary embodiment a user device 102 executes a software application ('app') and/or authorizes the application to transmit notifications or communications to the user device 102 executing the application and/or a further user device 102 associated with the user. The notification engine 104 may be operated by, or in association with, a remote server associated with the application. In this case, the communication transmitted by the notification engine 104 may comprise a notification or 'alert' message sent by or in association with the application and the communication service used may comprise an Application Programming Interface (API).

The notification engine 104 may determine which communication scheme to use by any suitable means. It will be appreciated in what follows that determining a communication scheme may comprise determining either one or both of a communication service and a user device. The notification engine 104 may determine one or more communication schemes by determining communication services and/or user devices 102 that are available at a given time. The available communication services and/or user devices 102 may be determined in accordance with one or more of a location of the notification engine 104; a location of a user device 102; an identification of a user device 102 and/or an indication of the communication services that can be received by the user device 102; and any other criteria that may affect the communication services that are likely to be successfully received by a user device 102.

Additionally or alternatively, the notification engine 104 may select a communication scheme in accordance with predefined (or default) settings of the system 100 and/or the information provided by the user during registration at step 201a.

In an exemplary embodiment, the notification engine 104 determines a communication scheme to be used in accordance with past performance of communication schemes. For example, if the notification engine 104 determines that a predefined portion (or number) of communications transmitted using a given communication scheme have been successfully received during an observation period, the notification engine 104 may determine that the given communication scheme should be used to transmit the communication.

Similarly, if the notification engine 104 determines that a predefined portion or number of communications transmitted using a given communication scheme have not been received by a user device 102, the notification engine 104 may determine that the given communication scheme should not be used to transmit the communication. Determination of which communication scheme is to be used to transmit a communication is discussed in more detail with respect to FIG. 3.

At step 204 of method 200, the notification engine 104 determines or estimates whether the first communication has been received by the first user device 102. This estimation may be performed by any suitable means. For example, the notification engine 104 may determine whether an acknowledgement ('ACK') communication or any other type of confirmation of receipt has been received in response to the first communication.

In an exemplary embodiment, the first communication comprises a request or indication to the user to reply to the communication to confirm that it has been safely received. In this case, the notification engine 104 may then determine that the first communication was not received by the first user device 102 if a response from the first user device 102 is not received within a predefined period of time from transmitting the first communication. Alternatively, if a response is received from the first user device 102 within a predefined period of time, the notification engine 104 may determine that the first communication was successfully received by the first user device 102.

For example, the first communication may be an 'Actionable Notification' i.e. notification to which a user can reply or respond. In this case, the notification engine 104 may determine that the first communication was not received by the first user device 102 if no reply is received from the user within a predefined period of time after transmission of the first Actionable Notification.

In an exemplary embodiment, the first communication is an SMS message and the notification engine 104 determines that the first communication was received by the first user device 102 if an acknowledgement of receipt is received within a predefined period after the notification engine 104 transmits the SMS message.

If, at step 204, the notification engine 104 estimates that the first communication was received by the first user device 102, the process ends, at step 206.

On the other hand if, at step 204, the notification engine 104 estimates that the first communication was not received by the first user device 102, the notification engine 104 determines a further communication scheme at step 208, wherein the further communication is different to the first communication scheme.

At step 208 of method 200, the notification engine 104 determines a further communication scheme for use to transmit a further communication. The further communication service defines a further communication service by which a further communication is to be transmitted and a further user device 102 to which the further communication is to be transmitted. As with the first communication scheme, it will be appreciated that determining the further communication scheme may comprise determining one or both of a further communication service and a further user device 102. Similarly, the further communication scheme may differ from the first communication scheme in respect of at least one of the parameters defined by the schemes (i.e. the communication services and/or the user devices 102).

The further communication scheme may be determined in any suitable way. For example, the further communication service may be determined in any of the ways discussed above in relation to the first communication service at step 202 or as discussed in more detail with respect to FIG. 3.

The further communication service defined by the further communication scheme may be any suitable communication means or service for transmitting a communication from the notification engine 104 to a user device 102. For example, the further communication service may be any of the above-listed communication services.

Similarly, the further user device 102 defined by the further communication scheme may be any suitable device 102 associated with the user. For example, the further user device 102 may be a device 102 specified by the user at step 201*a*.

The further user device 102 may be the same as the first user device 102, in which case, the further communication service must be different to the first communication service. Alternatively, the further user device 102 may be a device other than the first user device 102, in which case the further communication service may be, but is not necessarily, the same as the first communication service.

At step 210 of method 200, the notification engine 104 transmits a further communication in accordance with the determined further communication scheme by transmitting a communication to the further user device using the further communication service. For example, if the first communication was an application notification sent via an Application Programming Interface (API) to a tablet device associated with the user, the further communication may be an SMS sent to a portable telephone also associated with the user. In this manner, if the user fails to receive the notification on his/her tablet device due, for example, to a failure in one or more of the application software, the data network, or the physical device; the user can still be notified using an alternative communication service on a different device.

In an exemplary embodiment, processing then continues at step 204 at which the notification engine 104 determines whether the further communication is received by the user device 102. As with the first communication, responsive to determining that the further communication is not received by the further user device 102, the notification engine 104 may then repeat steps 208 and 210. In this manner, responsive to determining that a communication has not been received by a device associated with the user, the notification engine 104 transmits further communications, each in accordance with a respective communication scheme, until such time as a limiting condition is determined to have been met.

The limiting condition may, for example, be that no further communication schemes are determined at step 208. For example, at step 208 the notification engine 104 may determine or identify the further communication scheme from a predefined set of communication schemes, e.g. a number of communication schemes available to a user device 102 or an application being executed thereon in association with which the communication is being transmitted. The notification engine 104 may then cease repetition of steps 204 to 208 when a communication has been transmitted in accordance with each of the communication schemes in the set. Additionally or alternatively, the limiting condition may comprise one or more of: a predefined number of times that the steps are to be repeated; expiration of a predefined period of time since transmission of the first communication; or any other suitable limiting factor.

In this manner, the notification engine 104 adapts to a given operational environment to improve the reliability with which a user can be notified of the occurrence of an event.

Figure 3:
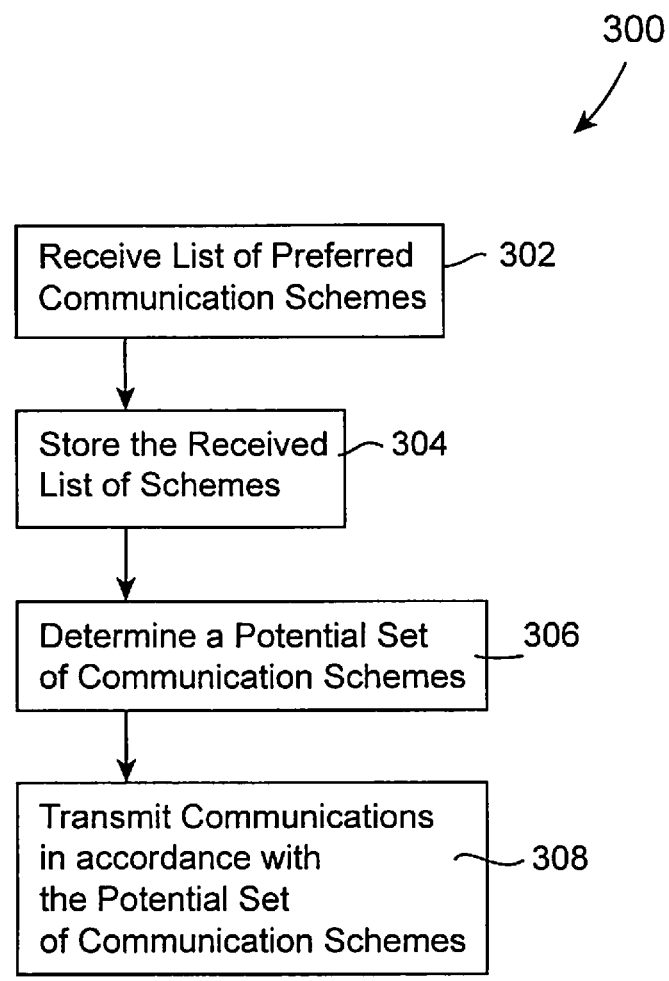
FIG. 3 is a flow diagram depicting a method of determining a set of potential communication services in accordance with an embodiment of the disclosure.

FIG. 3 depicts a method 300 of determining a communication scheme in accordance with an exemplary embodiment of the present disclosure. At step 302, the notification engine 104 receives a list of preferred communication schemes. Each of the communication schemes comprised within the list defines at least one of a communication service to be used to transmit the communication and a user device to which the communication is to be transmitted.

In an embodiment in which a communication scheme comprised within the list defines a communication service but not a user device, the notification engine 104 may determine a user device in any suitable manner. For example, the notification engine 104 may determine a user device in any of the manners described above in relation to FIG. 2. Similarly, if a communication scheme comprised within the list defines a user device but not a communication service, the notification engine 104 may determine a communication service in any suitable manner, e.g. the manners described above in relation to FIG. 2.

The list of preferred communication schemes may be indicative of a list of preferred communication schemes for one or more of a predefined period of time; a predefined location of a user device 102; and a predefined location of the notification engine 104.

The notification engine 104 may, for example, retrieve the list of preferred communication schemes from the database 108. Additionally or alternatively, the notification engine 104 may receive a list of preferred communication schemes that is transmitted, e.g. broadcast, multi-cast, or simulcast by an information service.

In an exemplary embodiment, the notification engine 104 receives the list of preferred communication schemes from a user device 102. For example, prior to the notification engine 104 transmitting the first communication at step 202 of method 200, the notification engine 104 may receive the list of preferred communication schemes from the user device 102. The list of preferred communication services may, for example, be provided by a user of the user device 102 during a registration step 202*a*.

Additionally or alternatively, the notification engine 104 may receive the list of preferred communication schemes from a remote server. For example, in an embodiment in which the first communication is a notification transmitted in association with an application ('app') being executed on a user device 102, a remote server associated with the application may transmit or otherwise provide the list of preferred communication schemes to the notification engine 104. The preferred communication schemes included in the list may be a predefined set of communication schemes that may define communication services supported by/or available for use with the application. Similarly, the preferred communication schemes may define user devices 102 executing the software application ('app') at a given time. The preferred list of communication schemes may comprise communication schemes selected by a user, for example, when authorizing the application to provide notifications and/or other communications to the one or more devices associated with the user.

At step 304 of method 300, the notification engine 104 stores the received list of communication schemes in association with an indication of an identity of the user. The user devices 102 defined by the listed communication schemes may comprise indications of the user devices, for example, a model number or any other identifier associated with a user device 102. The notification engine 104 may store the received list in association with a user identity in any memory comprised within, or accessible to, the notification engine 104. For example, the notification engine 104 may store the received list in association with the user device identity in the database 108.

At step 306 of method 300, the notification engine 104 determines a potential set of communication schemes based, at least in part, on the received list of preferred communication schemes. The potential set of communication schemes may, for example, be the same as the received list of preferred communication services.

Alternatively, the potential set of communication schemes may comprise a subset of the preferred communication services. In an exemplary embodiment, the notification engine 104 determines which of the communication services and/or user devices of the preferred communication schemes are available based on one or more of a current time; a location of the notification engine 104; and a location of the user devices 102.

In an exemplary embodiment, a user device 102 defined by a communication scheme is a mobile device and the notification engine 104 determines that the user device 102 is currently located in an area in which wireless internet access (e.g. 2G, 3G, 4G) is not available. The notification engine 104 then determines that the communication schemes defining this user device 102 must define a communication service not reliant on wireless internet in order to be included in the set of potential schemes.

Additionally or alternatively, the notification engine 104 may determine the potential set of communication schemes based on observed performance of the services and/or user devices 102 defined in the received list of preferred communication schemes. For example, the notification engine 104 may eliminate schemes defining communication services that have been observed to be unsuccessful within a predefined period of time. In this manner, the use of 'overloaded' networks can be avoided. For example, during a sporting event, the large increase in demand for wireless internet access may result in communications transmitted using wireless internet being 'dropped' by the network. Accordingly, even though wireless internet is an available communication service, the notification engine 104 may determine that, based on recent performance, this communication service should not be used.

At step 308 of method 300, the notification engine 104 transmits a communication (i.e. one or other of the first communication or the further communication) in accordance with a selected communication one of the potential set of communication schemes. The communication scheme may be selected from the potential set in any suitable manner. For example, the communication scheme may be selected randomly or in accordance with a predefined order. In an exemplary embodiment, the communication scheme may be selected in accordance with an order of the list of preferred communication schemes.

Figure 4:
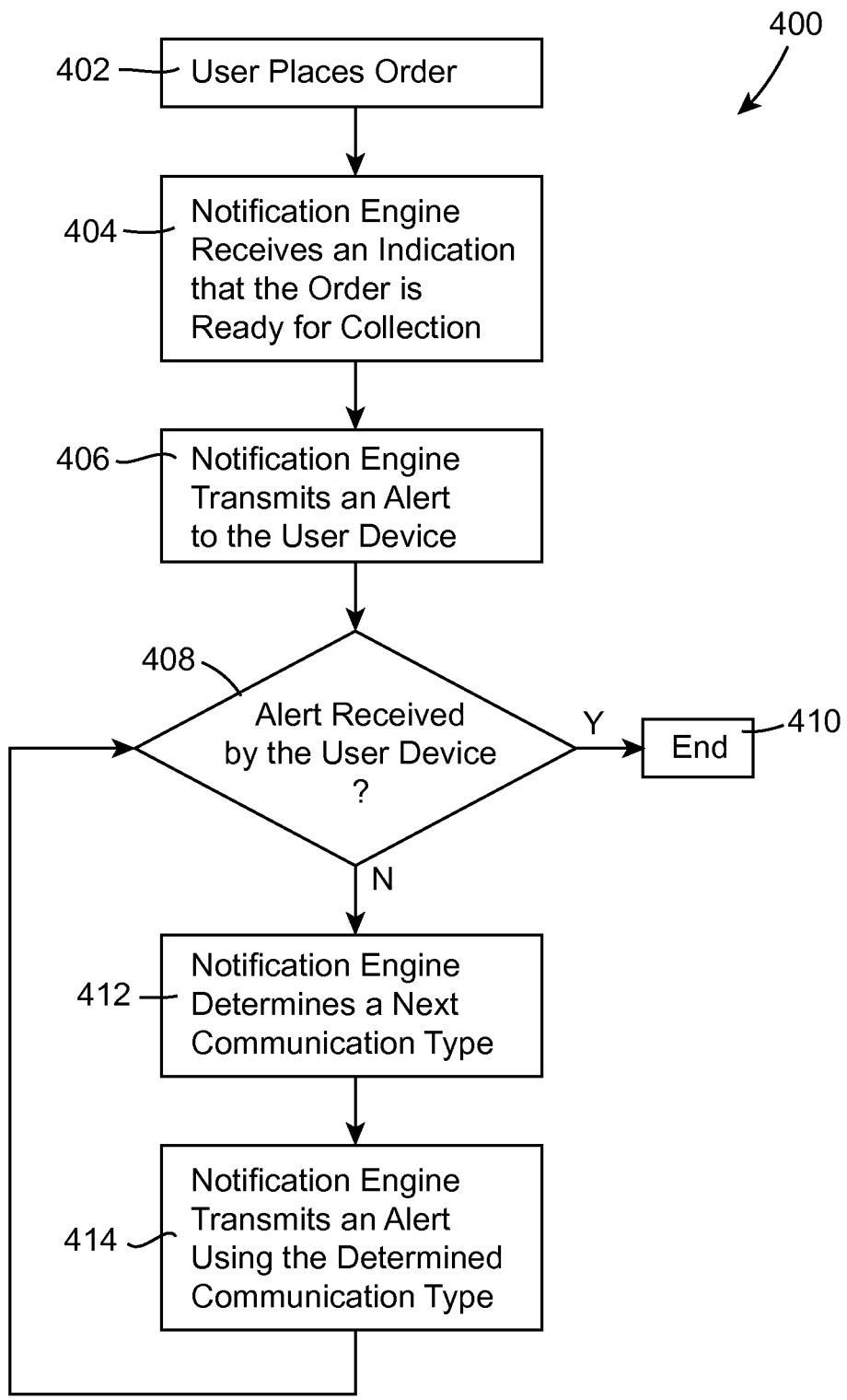
FIG. 4 is a flow diagram depicting a method according to an exemplary embodiment of the disclosure.

FIG. 4 depicts a method 400 according to an exemplary embodiment of the disclosure in which a user attending a concert or sporting event uses the system to be alerted when an order is ready for collection.

At step 402 the user places the order via a user interface (UI) of a software application ('app') being executed by a processor of a user device 102. The order is communicated to a service provider, e.g. a food outlet. For example, the order may be communicated to the service provider via the network 106 and/or via a remote server associated with the software application.

Subsequent to the order being completed by the service provider, the notification engine 104 receives an indication that the order is ready for collection, at step 404. This indication may be transmitted to the notification engine 104 via any suitable means. For example, the notification may be transmitted from the service provider over the network 106 and/or via a remote server associated with the software application.

The notification engine 104 determines, from the received indication and/or information stored in the database 108, a user device 102 associated with the order and the type of notification to be sent to the user device 102. The notification engine 104 may perform this determination by any suitable means. For example, the received indication may comprise information indicative of one or more of the user device 102; a number of the order placed by the user; and the software application used to place the order.

In the exemplary embodiment of FIG. 4, the notification engine 104 determines that an actionable notification or alert should be transmitted to the software application running on the user device 102 that transmitted the request and using an Application Programming Interface (API) to alert the user to the fact that the food is ready for collection. At step 406 the notification engine 104 transmits the actionable notification.

At step 408, the notification engine 104 determines whether or not the notification was received by the user device 102. In the exemplary embodiment of FIG. 4, if the notification engine 104 receives a response to the actionable notification within a predefined period of time, the notification engine 104 determines that the notification has been received by the user. Accordingly, the user has been successfully notified that the order is ready for collection and processing ends at step 410.

Alternatively, if the notification engine 104 does not receive a response to the actionable notification within a predefined period of time, the notification engine 104 determines that the user device 102 has not received the notification. For example, overloading of the wireless internet network 106 may have caused the notification to be 'dropped' and therefore not received by the user device 102. Such overloading of the network may commonly occur at sporting events or concerts due to the large demand on the network.

In this case, processing continues at step 412 at which the notification engine 104 determines the next type of communication or alert to send to the user and/or a next device to which the next type of communication or alert should be transmitted. As discussed in relation to FIG. 2 and FIG. 3 the next type of communication and/or the next device may, for example, be determined in accordance with user preferences defined via the software application.

In an exemplary embodiment, at step 412, the notification engine 104 determines that the next alert should be sent to the same device as the first alert but this time using SMS. At step 414, the notification engine 104 then transmits an SMS alert to the user device 102 indicating that the order is ready for collection.

Subsequent to transmitting the SMS message at step 412, processing returns to step 408 at which the notification engine 104 determines whether or not the alert has been received by the user device 102. As with the first notification, the notification engine 104 may determine that the SMS message was not received by the user device 102 if no response to the message is received from the user device 102. Additionally or alternatively, the notification engine 104 may determine that the SMS message was not received by the user device 102 if a delivery acknowledgment is not received within a predefined period of time after transmission of the notification.

As discussed in relation to FIG. 2 and FIG. 3, the notification engine 104 may continue to transmit different types of alert and/or alerts to different devices associated with the user until it is determined that a device associated with the user device 102 has received an alert or until some other limiting condition occurs. For example, in the exemplary embodiment of FIG. 4, if the notification engine 104 determines that the SMS alert was not received by the user device 102, the notification engine 104 may next transmit an SMS alert to a second device 102 associated with the user. In this manner, if a first device associated with the user is unable to receive an alert, the user may still be successfully notified. For example, where a first user device 102 runs out of battery power or is operating on a network with limited coverage, the user can be notified via a second device such as a device belonging to a friend.

Similarly, in an exemplary embodiment in which the notification engine 104 determines that a communication has not been received by a mobile user device 102, the notification engine 104 can instead initiate a voice call to a home telephone (i.e. a 'land-line' or 'fixed-line' telephone) associated with the user.

The process 400 ends when the notification engine 104 determines that either (i) a communication has been successfully received by the user device 102; or (ii) that all suitable communication services have been tried.

It should be appreciated that the functions described herein, in some embodiments, may be described in computer executable instructions stored on a computer readable media (e.g., in a physical, tangible memory, etc.), and executable by one or more processors. The computer readable media is a non-transitory computer readable storage medium. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

It should also be appreciated that one or more aspects of the present disclosure transform a general-purpose computing device into a special-purpose computing device when configured to perform the functions, methods, and/or processes described herein.

Further, it should be appreciated that the present disclosure is not limited to the embodiment(s) described herein but can be amended or modified without departing from the scope of the present disclosure. It will be appreciated that the methods described are by way of example only and various modifications of the disclosed methods may be made. For example, the order in which steps of the methods are performed may be altered or individual steps may be omitted.

With that said, exemplary embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular exemplary embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

The foregoing description of exemplary embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of transmitting a communication to a user, the method comprising:
   (a) determining, by a processor, a first communication scheme from a potential set of communication schemes;
   (b) transmitting, by the processor, a first communication in accordance with the first communication scheme, the first communication scheme defining a first communication service by which the first communication is to be transmitted and a first user device to which the first communication is to be transmitted;
   (c) determining, by the processor, whether an acknowledgment response has been received from the first user device within a predefined period from transmission of the first communication; and
   responsive to determining that the first communication was not received by the first user device:

(d) determining, by the processor, a further communication scheme different from the first communication scheme, the further communication scheme defining a further communication service by which a further communication is to be transmitted and a further user device to which the further communication is to be transmitted; and (e) transmitting, by the processor, the further communication in accordance with the further communication scheme;

wherein the potential set of communication schemes is based on one or more of:
  a location of at least one of the first user device and the further user device; and
  an application being executed on the first user device and/or the further user device.

2. The method of claim 1, wherein the further user device is physically different from the first user device.

3. The method of claim 1, further comprising:
determining, by the processor, whether the further communication is received by the further user device, and responsive to determining that the further communication was not received by the further user device:
repeating steps (d) and (e).

4. The method of claim 3, wherein repeating steps (d) and (e) comprises repeating steps (d) and (e) until one or more of the following conditions has been met:
  no further communication scheme is determined at step (d);
  a predefined period of time has expired since transmission of the first communication; and
  steps (d) and (e) have been performed a predefined number of times.

5. The method of claim 1, wherein prior to performing steps (a) to (e), the method comprises:
  receiving a list of preferred communication schemes from a device associated with the user;
  storing the received list of communication schemes in association with an identifier of the user; and
  determining the potential set of communication schemes based, at least in part, on the received list of preferred communication schemes;
  wherein at step (d) the further communication scheme is determined from the potential set of communication schemes.

6. The method of claim 5, wherein the received list of preferred communication schemes has an associated list order and wherein the further communication scheme is determined in accordance with the list order.

7. The method of claim 1, wherein the first and/or further communication is associated with the application being executed on at least one of the first user device and the further user device.

8. The method of claim 7, wherein the first and/or further communication comprises information received from a remote server associated with the application being executed on the at least one user device.

9. The method of claim 1, wherein the set of potential communication schemes comprises two or more communication schemes each of which defines a respective communication service from the group of:
  transmission of data using Short Message Service (SMS);
  initiation of an audio transmission via a Public Switched Telephone Network (PSTN) and/or a Private Branch Exchange (PBX) to the user device;
  transmission of data using SMTP or TCP/IP protocol;
  transmission of an application notification; and
  transmission of data using Bluetooth™.

10. A notification engine for transmitting a communication to a user, the notification engine comprising at least one processor configured to:
  (a) determine a first communication scheme from a potential set of communication schemes;
  (b) transmit a first communication in accordance with the first communication scheme, the first communication scheme defining a first communication service by which the first communication is to be transmitted and a first user device to which the first communication is to be transmitted;
  (c) determine whether an acknowledgement response has been received from the first user device within a predefined period from transmission of the first communication and,
  responsive to determining that an acknowledgement receipt has not been received from the first user device:
    (d) determine a further communication scheme different to the first communication scheme, the further communication scheme defining a further communication service by which a further communication is to be transmitted and a further user device to which the further communication is to be transmitted; and
    (e) transmit a further communication in accordance with the further communication scheme;
  wherein the potential set of communication schemes is based on one or more of:
    a location of at least one of the first user device and the further user device; and
    an application being executed on the first user device and/or the further user device.

11. The notification engine of claim 10, wherein the at least one processor is configured to determine whether the communication is received by the first user device by:
  determining whether an acknowledgment response has been received from the first user device within the predefined period from transmission of the first communication.

12. The notification engine of claim 10, wherein the at least one processor is further configured to:
  determine whether the further communication is received by the further user device, and responsive to determining that the further communication was not received by the further user device to:
  repeat steps (d) and (e), until the at least one processor determines that one or more of the following conditions has been met:
    no further communication scheme is determined at step (d);
    a predefined period of time has expired since transmission of the further communication; and
    steps (d) and (e) have been performed a predefined number of times.

13. The notification engine of claim 10, wherein prior to performing steps (a) to (e), the at least one processor is configured to:
  receive a list of preferred communication schemes from a device associated with the user;
  store the received list of communication schemes in association with an identifier of the user; and
  determine the potential set of communication schemes based, at least in part, on the received list of preferred communication schemes;
  wherein at step (d) the further communication scheme is determined from the potential set of communication schemes.

14. The notification engine of claim 13, wherein the received list of preferred communication schemes has an associated list order and wherein the at least one processor is configured to determine the further communication scheme in accordance with the list order.

15. The notification engine of claim 10, wherein the first and/or further communication is associated with the application being executed on at least one of the first user device and the further user device.

16. The notification engine of claim 15, wherein the first and/or further communication comprises information received from a remote server associated with the application being executed on the at least one of the first user device and the further user device.

17. The notification engine of claim 10, wherein the set of potential communication schemes comprises two or more communication schemes each defining a respective communication service from the group of:
    transmission of data using Short Message Service (SMS);
    initiation of an audio transmission via a Public Switched Telephone Network (PSTN) and/or a Private Branch Exchange (PBX) to the user device;
    transmission of data using SMTP or TCP/IP protocol;
    transmission of an application notification; and
    transmission of data using Bluetooth™.

18. A non-transitory computer readable storage medium comprising instructions which, when executed, cause at least one processor to:
  (a) determine a first communication scheme from a potential set of communication schemes;
  (b) transmit a first communication in accordance with the first communication scheme, the first communication scheme defining a first communication service by which the first communication is to be transmitted and a first user device to which the first communication is to be transmitted;
  (c) determine whether an acknowledgement response has been received from the first user device within a predefined period from transmission of the first communication and, responsive to determining that the first communication was not received by the first user device:
  (d) determine a further communication scheme different to the first communication scheme, the further communication scheme defining a further communication service by which a further communication is to be transmitted and a further user device to which the further communication is to be transmitted; and
  (e) transmit a further communication in accordance with the further communication scheme;
  wherein the potential set of communication schemes is based on one or more of:
    a location of at least one of the first user device and the further user device; and
    an application being executed on the first user device and/or the further user device.

19. The non-transitory computer readable medium of claim 18, wherein the first and/or further communication is associated with the application being executed on at least one of the first user device and the further user device.

20. The non-transitory computer readable medium of claim 18, wherein the instructions, when executed by the at least one processor, further cause the at least one processor to:
  determine whether the further communication is received by the further user device; and
  responsive to determining that the further communication was not received by the further user device:
    repeat (d) and (e) until one or more of the following conditions has been met:
      no further communication scheme is determined at (d);
      a predefined period of time has expired since transmission of the further communication; and
      (d) and (e) have been performed a predefined number of times.

21. The method of claim 1, wherein the potential set of communication schemes is based on the location of at least one of the first user device and the further user device.

\* \* \* \* \*